Sept. 11, 1951 H. NAUGHT 2,567,392
FLUID SUSTAINED AIRCRAFT
Filed June 28, 1948 4 Sheets-Sheet 1
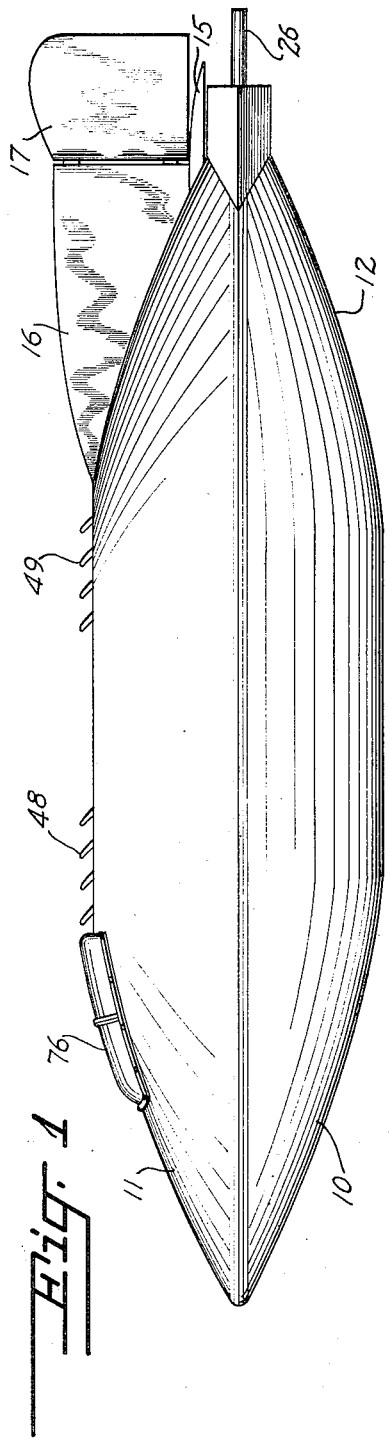
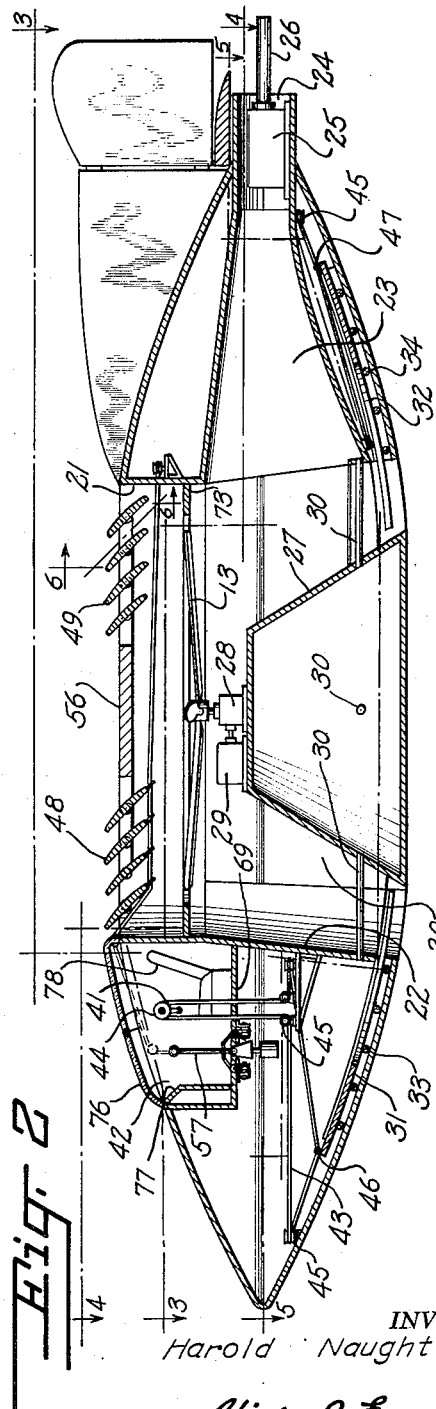
INVENTOR.
Harold Naught
BY *Victor J. Evans & Co.*
ATTORNEYS Sept. 11, 1951      H. NAUGHT      2,567,392
FLUID SUSTAINED AIRCRAFT Filed June 28, 1948      4 Sheets-Sheet 2

INVENTOR.
Harold Naught

BY *Victor J. Evans & Co.*

ATTORNEYS

Sept. 11, 1951 — H. NAUGHT — 2,567,392
FLUID SUSTAINED AIRCRAFT
Filed June 28, 1948 — 4 Sheets-Sheet 3

INVENTOR.
Harold Naught
BY Victor J. Evans & Co.
ATTORNEYS

Sept. 11, 1951  H. NAUGHT  2,567,392
FLUID SUSTAINED AIRCRAFT
Filed June 28, 1948  4 Sheets-Sheet 4

INVENTOR.
Harold Naught
BY *Victor J. Evans & Co.*
ATTORNEYS

Patented Sept. 11, 1951

2,567,392

UNITED STATES PATENT OFFICE 2,567,392

FLUID SUSTAINED AIRCRAFT

Harold Naught, Rushville, Ill.

Application June 28, 1948, Serial No. 35,556

3 Claims. (Cl. 244—23)

This invention relates to aircraft of the helicopter and heavier than air type and particularly where the propeller is horizontally positioned in a vertically disposed cylinder, and in particular the invention relates to improvements in aircraft of this type wherein the propeller is positioned in a well in a large disc and the disc is provided with stabilizing means and means for controlling the passage of air through the well.

The purpose of this invention is to prove an improved method of stabilizing aircraft of the helicopter type and particularly of the type having a circular wing in the form of a large disc with a horizontally disposed propeller positioned in a vertically positioned well therein.

Various attempts have been made to stabilize aircraft of the circular disc-like type but the gyroscopic action of the propeller causes uneven stresses and strains which result in tilting and make balancing difficult. With this thought in mind this invention contemplates a helicopter in the form of a large disc with a propeller in a vertically disposed well in the center and with means for regulating the area of both the upper and lower ends of the well, and which is also provided with suitable elevators, stabilizers, ailerons and rudders.

The object of this invention is, therefore, to provide means for constructing aircraft of the helicopter type wherein the wing structure may be made circular and substantially flat and which is provided with internal means for maintaining it in a horizontal position.

Another object of the invention is to provide a helicopter having a propeller in a centrally disposed well in which regulating means is provided at both ends of the well for stabilizing the device.

Another object of the invention is to provide means for stabilizing aircraft of the helicopter type by controlling air currents around the propeller.

A further object of the invention is to provide a helicopter in the form of a large disc with stabilizing means incorporated therein, which is of a simple and economical construction.

With these and other objects and advantages in view the invention consists of the new and useful combination, construction, and arrangement of parts as hereinafter more fully described, set forth in the claims appended hereto, and disclosed in the accompanying drawings forming part hereof, wherein:

Figure 1 is a view showing a side elevation of the helicopter.

Figure 2 is a vertical longitudinal section through the aircraft showing the relative positions of the elements.

Figure 3:
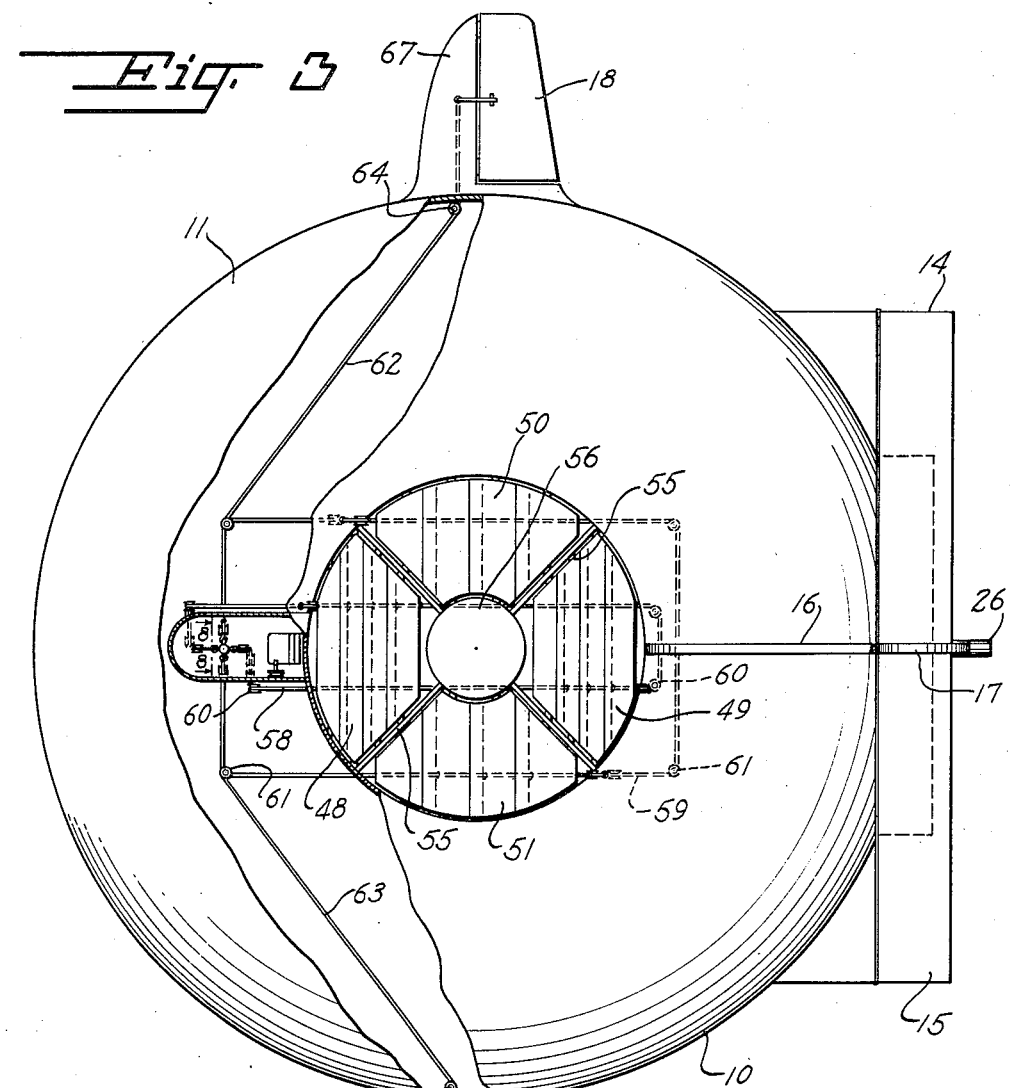
Figure 3 is a sectional plan through the aircraft taken on line 3—3 of Figure 2 with part broken away showing the aileron control cables.
Figure 8:
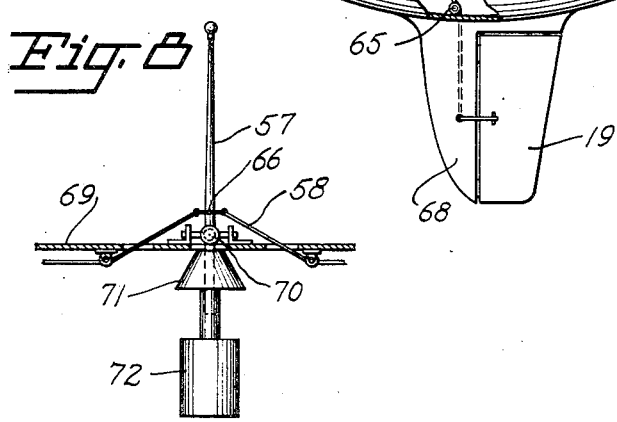
Figure 8 is a detail illustrating the mounting of the control lever or stick.

Referring now to the drawings wherein like reference characters denote corresponding parts the improved airship or helicopter of this invention includes a body 10 providing a combination fuselage and wing and having an upper wall 11 and a lower wall 12, a propeller 13, elevators 14 and 15, a vertical stabilizer 16, a rudder 17, and ailerons 18 and 19.

The body 10 is formed with a centrally disposed vertical well 20 having a straight upper section 21 and a lower gradually enlarging section 22, and the lower section is provided with a rearwardly extending tunnel 23 having converging walls forming a throat 24 at the rear through which air is discharged with a jet-like action to provide power for traveling horizontally. A jet motor 25 with a nozzle 26 may be mounted in the throat 24 which may be used for horizontal driving power, or as auxiliary power, if desired.

Figure 4:
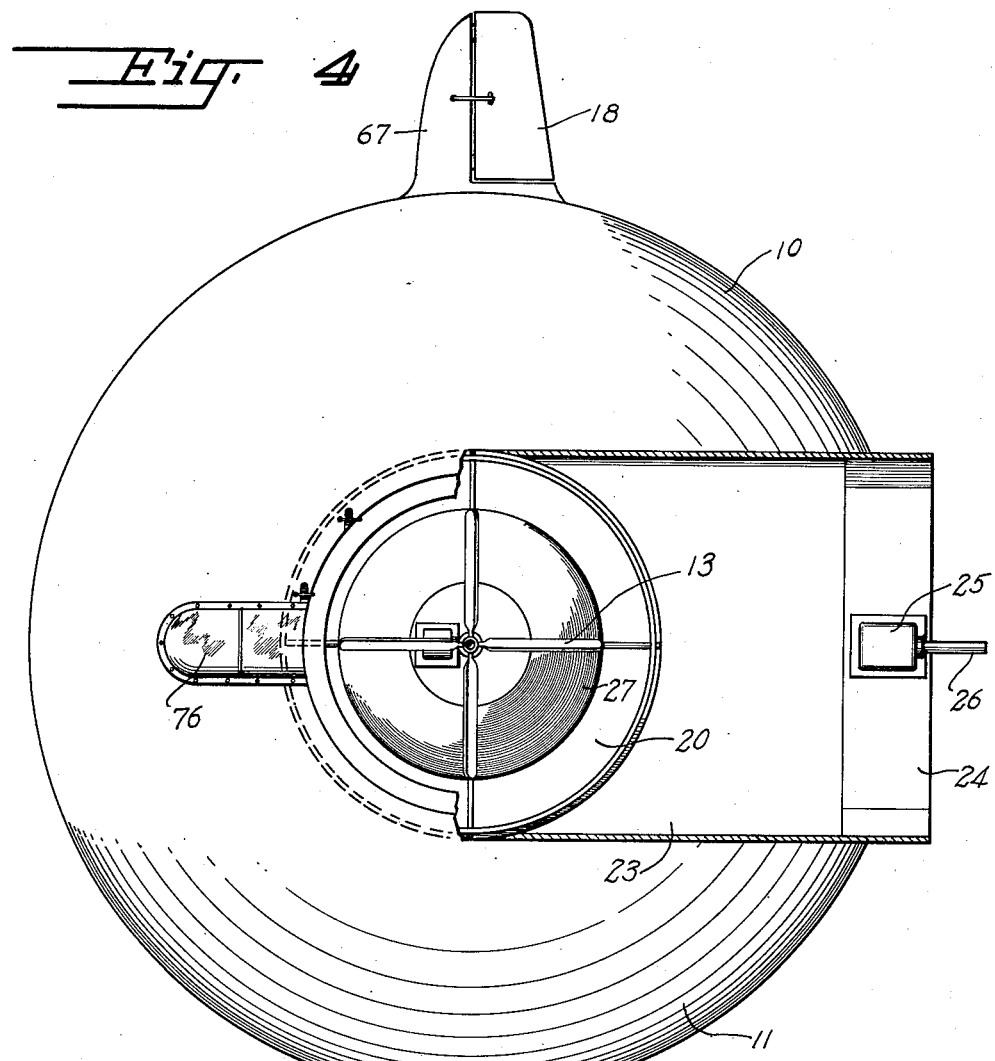
Figure 4 is a plan view of the aircraft taken on line 4—4 of Figure 2 with part broken away showing the air tunnel for horizontal travel.

The propeller 13 is positioned in the upper straight section 21 and mounted on a frustroconical casing 27 through a gear housing 28 and a motor 29 is also mounted on the casing 27 and connected to the gear housing for driving the propeller. The casing 27 is supported by struts 30 from the side wall of the well as shown in Figures 2 and 4. The air forced downwardly by the propeller strikes the outer surface of the cone and is deflected outwardly at an angle of approximately five to ten degrees, and being forced through a comparatively small peripheral opening is ejected with a jet-like force.

Figure 5:
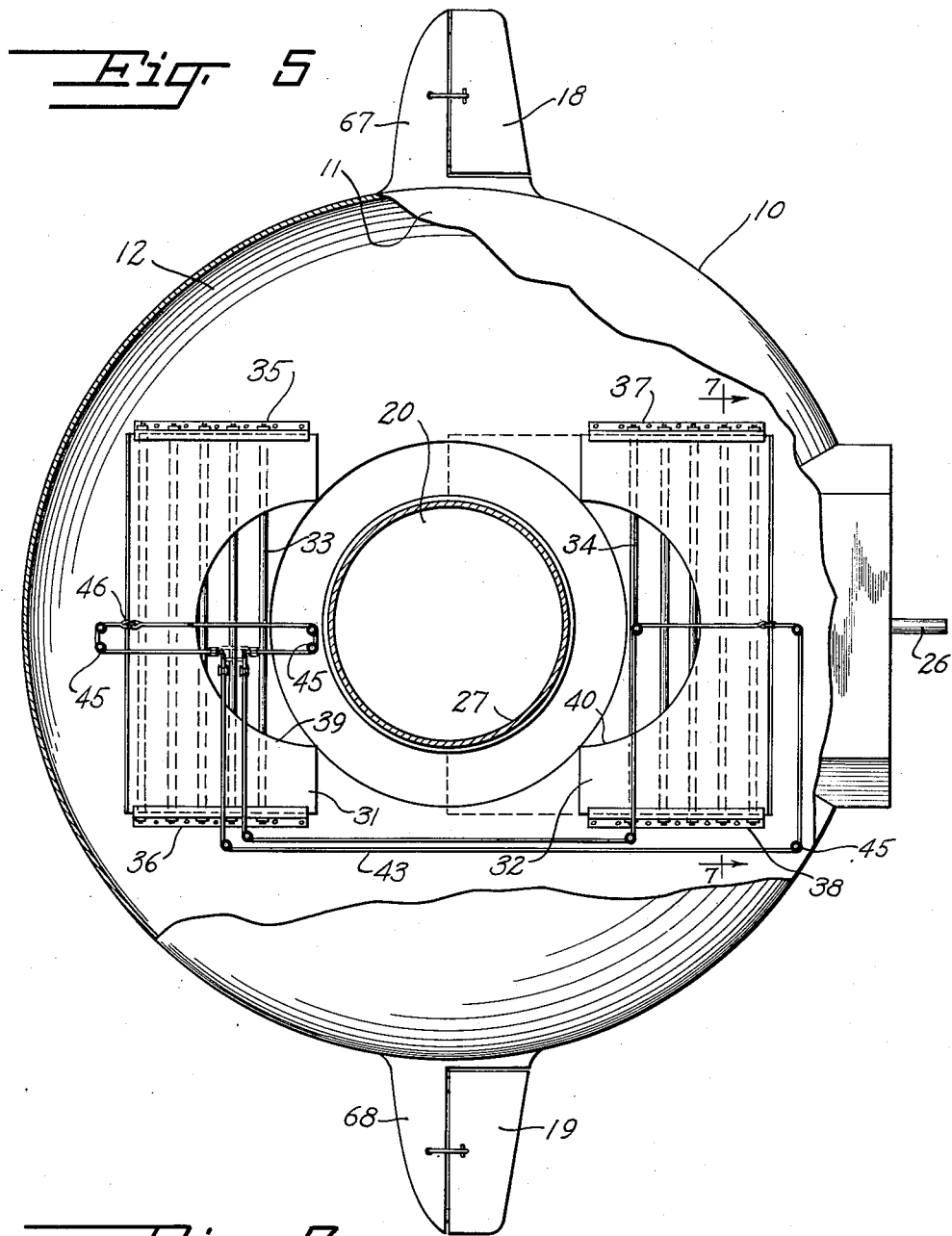
Figure 5 is a sectional plan taken on line 5—5 of Figure 2 showing the elements for regulating the area at the lower end of the air well.
Figure 7:
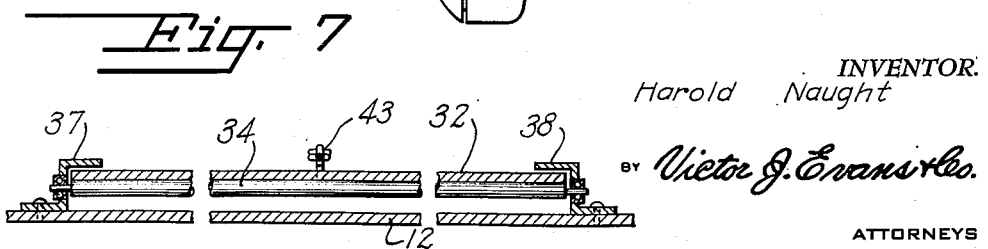
Figure 7 is a detail taken on line 7—7 of Figure 5 showing the roller bearings for mounting the control slides at the lower end of the air well.

The area of the peripheral opening around the base of the cone is controlled by slides or sliding plates 31 and 32 as shown in Figure 5, and the plates are mounted on rollers 33 and 34 in tracks formed with angles 35 and 36 for the plate 31, and 37 and 38 for the plate 32. The inner edges of the plates are provided with semi-circular recesses 39 and 40 which straddle the cone or casing 27, and the positions of the plates are controlled by a crank 41 in a cockpit 42 through a cable 43 on a drum 44. The cable extends downwardly as shown in Figure 2 and is trained over pulleys 45 and attached to the plate 31 at the point 46, and to the plate 32 at the point 47. As the crank is turned the plates are actuated to positions toward or away from the casing 27 thereby decreasing or increasing the area of the discharge opening around the base of the cone.

Figure 6:
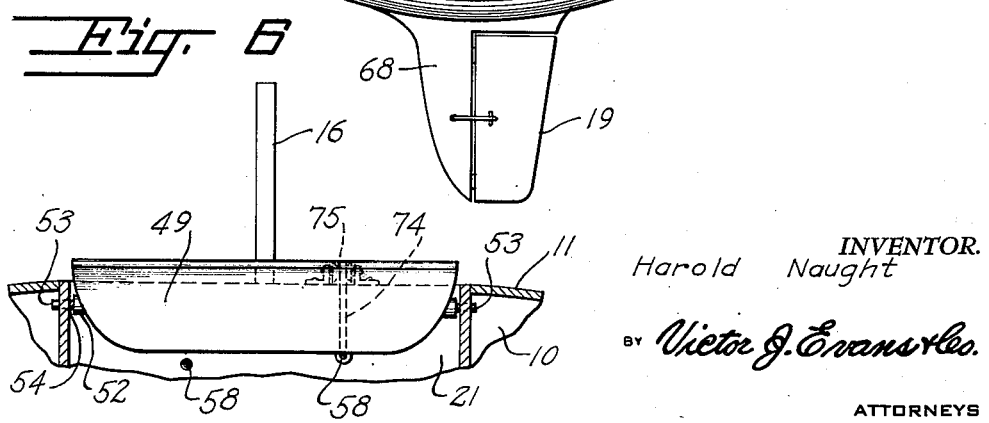
Figure 6 is a detail taken on line 6—6 of Figure 2 showing the mounting of one of the air control shutters at the upper end of the air well.

The air inlet opening at the upper end of the well is controlled by four sets of shutters 48, 49, 50 and 51, as shown in Figure 3, and the shutters are mounted on individual shafts 52 as illustrated in Figure 6. The ends 53 of the shafts, which are reduced in diameter to provide shoulders 54, are journaled in the wall of the upper straight section 21 of the well, at one end with the inner ends journaled in arms 55 of a spider 56. These shutters are actuated by the stick 57 through cables 58 and 59 that are trained over pulleys 60 and 61, respectively, and forward and backward movement of the stick opens and closes the shutters 48 and 49 while lateral movement thereof opens and closes the shutters 50 and 51. The opening and closing of these shutters provides stabilizing means for the aircraft as it controls the flow of air to the propeller.

Lateral movement of the stick 57 also actuates the ailerons 18 and 19 through the cables 62 and 63 which are trained over pulleys 64 and 65 respectively, and connected to the stick at the point 66. The ailerons 18 and 19 are hinged to the edges of fins 67 and 68 extending from the sides of the body 10.

The stick 57 is mounted on the floor 69 of the cockpit 42 through a universal joint 70 and weights 71 and 72 are provided on the lower end whereby the stick is held upright by gravity. The battery of the aircraft may be used as the weights.

The upper straight section 21 of the well is provided with an annular ring 73 which is spaced slightly from the tips of the propeller blades to force the air into the propeller. The shutters in the upper end of the well may be attached to the operating cables through arms 74 which are mounted in bearings 75, as shown in Figure 6.

The cockpit 42 is provided with a transparent cover 76 and an instrument panel 77 and a seat 78 are provided therein.

The fuel tanks and cargo may be placed in the frustro-conical casing 27.

With the parts arranged in this manner an operator in the cockpit has absolute control over the aircraft at all times and by adjusting the positions of the shutters and slides the plane may be stabilized and raised and lowered, or driven horizontally, as may be desired.

It will be understood that the positions of the slides and shutters may be reversed, or shutters or slides may be used at both ends of the well, or any suitable means may be used for adjusting the areas at the ends of the well.

It will also be understood that other modifications may be made in the design or arrangement of the parts without departing from the spirit of the invention.

What is claimed is:

1. In an airship, the combination which comprises a horizontally disposed circular body having arcuate upper and lower walls tapering from a section having flat upper and lower surfaces at the center to an outer edge V-shape in cross section, a centrally positioned vertically disposed cylindrical wall having a gradually enlarging lower end extended through the said center section having the flat upper and lower surfaces of the body providing a substantially open vertically disposed well extended through the body, a hollow frustro-conical shaped centrally disposed base positioned in the lower part of the said well with the periphery of the lower end thereof spaced from the lower end of the wall of the well providing an annular air passage in the lower flat surface of the body, a horizontally disposed propeller journaled on the upper end of the said frustro-conical shaped base and spaced downwardly from the upper end of the well, a plurality of units of shutters positioned in the upper end of the well and journaled in the upper part of the body, means actuating the shutters for controlling the passage of air through sections of the upper end of the well independently, plates slidably mounted in the lower part of the body and positioned to pass into the lower part of the well for closing the said annular passage in the lower part of the body and thereby controlling the passage of air through the lower end of the well, means for rotating the propeller, a tunnel rectangular shaped in cross section extended from said well to a point at the rear edge of the said body providing a rear outlet for air in the well, ailerons extended from the sides of the body and adjustably mounted thereon, a vertically disposed stabilizer positioned on the upper surface of the body, and a rudder pivotally mounted on the said stabilizer.

2. In an airship, the combination which comprises a horizontally disposed circular body having arcuate upper and lower walls tapering from a section having flat upper and lower surfaces at the center to an outer edge V-shape in cross section, a centrally positioned vertically disposed cylindrical well having a gradually enlarging lower end extended through the said center having the flat upper and lower surfaces of the body providing a substantially open vertically disposed well extended through the body, a hollow frustro-conical shaped centrally disposed base positioned in the lower part of the said well with the periphery of the lower end thereof spaced from the lower end of the wall of the well providing an annular air passage in the lower flat surface of the body, a horizontally disposed propeller journaled on the upper end of the said frustro-conical shaped base and spaced downwardly from the upper end of the well, a plurality of units of shutters positioned in the upper end of the well and journaled in the upper part of the body, means actuating the shutters for controlling the passage of air through sections of the upper end of the well independently, plates slidably mounted in the lower part of the body and positioned to pass into the lower part of the well for closing the said annular passage in the lower part of the body and thereby controlling the passage of air through the lower end of the well, means for rotating the propeller, a tunnel rectangular shaped in cross section extended from said well to a point at the rear edge of the said body providing a rear outlet for air in the well, a jet action motor positioned in the rear end of the tunnel for providing a jet propelling force to coact with the air from the propeller, ailerons extended from the sides of the body and adjustably mounted thereon, a vertically disposed stabilizer positioned on the upper surface of the body, and a rudder pivotally mounted on the said stabilizer.

3. In an airship, the combination which comprises a horizontally disposed circular body having arcuate upper and lower walls tapering from a section having flat upper and lower surfaces at the center to an outer edge V-shape in cross section, a centrally positioned vertically disposed cylindrical wall having a gradually enlarging lower end extended through the said center having the flat upper and lower surfaces of the body providing a substantially open vertically disposed well extended through the body, a hollow frustro-conical shaped centrally disposed base positioned in the lower part of the said well with the periphery of the lower end thereof spaced from the lower end of the wall of the well providing an annular air passage in the lower flat surface of the body, a horizontally disposed propeller journaled on the upper end of the said frustro-conical shaped base and spaced downwardly from the upper end of the well, a plurality of units of shutters positioned in the upper end of the well and journaled in the upper part of the body, means actuating the shutters for controlling the passage of air through sections of the upper end of the well independently, plates slidably mounted in the lower part of the body and positioned to pass into the lower part of the well for closing the said annular passage in the lower part of the body and thereby controlling the passage of air through the lower end of the well, means for rotating the propeller, a tunnel rectangular shaped in cross section extended from said well to a point at the rear edge of the said body providing a rear outlet for air in the well, ailerons extended from the sides of the body and adjustably mounted thereon, a vertically disposed stabilizer positioned on the upper surface of the body, a rudder pivotally mounted on the said stabilizer, a cockpit in the said body, and means controlling the rudders and sliding plates from the said cockpit.

HAROLD NAUGHT.

REFERENCES CITED

The following references are of record in the file of this patent:

UNITED STATES PATENTS

| Number | Name | Date |
|---|---|---|
| 1,344,283 | Webb | June 22, 1920 |
| 1,782,149 | Salisbury et al. | Nov. 18, 1930 |
| 1,822,386 | Andersen | Sept. 8, 1931 |
| 1,959,270 | Hedlof | May 15, 1934 |
| 2,077,471 | Fink | Apr. 20, 1937 |
| 2,377,835 | Weygers | June 5, 1945 |
| 2,461,435 | Neumann et al. | Feb. 8, 1949 |